(12) United States Patent
Takahashi

(10) Patent No.: US 10,742,003 B2
(45) Date of Patent: Aug. 11, 2020

(54) BUS BAR UNIT AND MOTOR

(71) Applicant: Nidec Corporation, Kyoto (JP)

(72) Inventor: Shunsuke Takahashi, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 0 days.

(21) Appl. No.: 16/487,513

(22) PCT Filed: Mar. 20, 2018

(86) PCT No.: PCT/JP2018/011184
§ 371 (c)(1),
(2) Date: Aug. 21, 2019

(87) PCT Pub. No.: WO2018/180816
PCT Pub. Date: Oct. 4, 2018

(65) Prior Publication Data
US 2020/0014178 A1  Jan. 9, 2020

Related U.S. Application Data

(60) Provisional application No. 62/479,490, filed on Mar. 31, 2017.

(30) Foreign Application Priority Data

Sep. 29, 2017 (JP) ................. 2017-191446

(51) Int. Cl.
*H02B 1/20* (2006.01)
*H02K 21/14* (2006.01)
(Continued)

(52) U.S. Cl.
CPC ............. *H02B 1/20* (2013.01); *H02K 3/50* (2013.01); *H02K 21/14* (2013.01); *H02K 5/225* (2013.01)

(58) Field of Classification Search
CPC .......... H02B 1/20; H02K 3/50; H02K 2203/09
See application file for complete search history.

(56) References Cited

U.S. PATENT DOCUMENTS 8,922,079 B2  12/2014  Egami et al.
2011/0001388 A1  1/2011  Fujii et al.
(Continued)

FOREIGN PATENT DOCUMENTS

DE  10 2015 001 096 A1  9/2016
JP  2003-134758 A  5/2003
(Continued)

OTHER PUBLICATIONS

Official Communication issued in International Patent Application No. PCT/JP2018/011184, dated Jun. 19, 2018.
(Continued)

*Primary Examiner* — Mukundbhai G Patel
(74) *Attorney, Agent, or Firm* — Keating & Bennett

(57) ABSTRACT

A bus bar unit includes a bus bar holder on one side in an axial direction of an annular stator around a central axis extending in a vertical direction, a bus bar extending along a plane perpendicular to the axial direction and fixed to the bus bar holder, and an external connection terminal connected to the bus bar and extending upward from the bus bar. The bus bar includes a wire and a terminal connector located on one end thereof and connected to the external connection terminal, a first lead wire connector located on the other end thereof and connected to a lead wire extending from the stator, a second lead wire connector located between the terminal connector and the first lead wire connector, and a first linear portion to connect the first and second lead wire connectors and having a linear shape when viewed in the axial direction. Each of the first and the second lead wire connectors has a U-shape that opens in a radial direction.

8 Claims, 9 Drawing Sheets

(51) Int. Cl.
*H02K 3/50* (2006.01)
*H02K 5/22* (2006.01)

(56) References Cited

U.S. PATENT DOCUMENTS

| | | | |
|---|---|---|---|
| 2013/0328425 A1 | 12/2013 | Tomita et al. | |
| 2015/0357878 A1* | 12/2015 | Fukunaga | H02K 3/50 310/71 |
| 2016/0190887 A1* | 6/2016 | Sambuichi | H02K 3/28 310/71 |
| 2016/0294240 A1* | 10/2016 | Kawamoto | H02K 5/225 |

FOREIGN PATENT DOCUMENTS

| | | |
|---|---|---|
| JP | 2007-174869 A | 7/2007 |
| JP | 2008-022620 A | 1/2008 |
| JP | 2010-011627 A | 1/2010 |
| JP | 2011-091885 A | 5/2011 |
| JP | 2013-042633 A | 2/2013 |
| JP | 2015-122880 A | 7/2015 |
| JP | 2015-142429 A | 8/2015 |
| JP | 2016-013053 A | 1/2016 |
| JP | 2016-039682 A | 3/2016 |
| JP | 2016-096708 A | 5/2016 |
| JP | 2016-174527 A | 9/2016 |
| JP | 5989496 B2 | 9/2016 |
| JP | 2017-011830 A | 1/2017 |
| JP | 2017-042004 A | 2/2017 |
| WO | 2015/151214 A1 | 10/2015 |

OTHER PUBLICATIONS

Takahashi, "Bus Bar Unit and Motor", U.S. Appl. No. 16/487,507, filed Aug. 21, 2019.

Yamashita et al., "Bus Bar Unit and Motor", U.S. Appl. No. 16/487,509, filed Aug. 21, 2019.

Yamashita et al., "Bus Bar Unit and Motor", U.S. Appl. No. 16/487,510, filed Aug. 21, 2019.

Yamashita et al., "Motor and Electric Power Steering Apparatus", U.S. Appl. No. 16/487,512, filed Aug. 21, 2019.

* cited by examiner

BUS BAR UNIT AND MOTOR

CROSS REFERENCE TO RELATED APPLICATIONS

This is a U.S. national stage of PCT Application No. PCT/JP2018/011184, filed on Mar. 20, 2018, and priority under 35 U.S.C. § 119(a) and 35 U.S.C. § 365(b) is claimed from U.S. Provisional Application No. 62/479,490, filed on Mar. 31, 2017, and Japanese Application No. 2017-191446, filed Sep. 29, 2017; the entire contents of each of which are hereby incorporated herein by reference.

1. Field of the Invention

The present disclosure relates to a bus bar unit and a motor.

2. Background

A motor provided with a bus bar unit is known. The bus bar unit includes a bus bar to which coils of each phase of a motor are connected. A connector for supplying power from the outside of the motor to the coils of each phase is connected to the bus bar.

For example, there have been prior arts involving bar units provided with a ring-shaped bus bar (bus ring) extending along a circumferential direction of a motor. In the bus bar unit, the bus bar is formed by bending a wire.

In the bus bar unit, bus bars are arranged on an outer side of a stator in a radial direction. Further, the bus bars of each phase are arranged concentrically at intervals in the radial direction of a motor. Thus, a dimension of the bus bar unit in the radial direction is increased. As the dimension of the bus bar in the radial direction increases, the length of a wire required to constitute the bus bar increases.

SUMMARY

Example embodiments of the present disclosure provide bus bar units each capable of being miniaturized and saving wire required to provide a bus bar.

One aspect of an example embodiment of the present disclosure provides a bus bar unit that is provided in a motor and includes a bus bar holder provided on one side in an axial direction of a stator disposed in an annular shape around a central axis extending in a vertical direction, a bus bar extending along a plane perpendicular to the axial direction and fixed to the bus bar holder, and an external connection terminal connected to the bus bar and extending upward from the bus bar. The bus bar includes a wire and a terminal connector located on one end thereof and connected to the external connection terminal, a first lead wire connector located on the other end thereof and connected to a lead wire extending from the stator, a second lead wire connector located between the terminal connector and the first lead wire connector, and a first linear portion to connect the first lead wire connector to the second lead wire connector and having a linear shape when viewed in the axial direction. Each of the first lead wire connector and the second lead wire connector have a U-shape that opens in a radial direction.

The above and other elements, features, steps, characteristics and advantages of the present disclosure will become more apparent from the following detailed description of the example embodiments with reference to the attached drawings.

DETAILED DESCRIPTION

Figure 1:
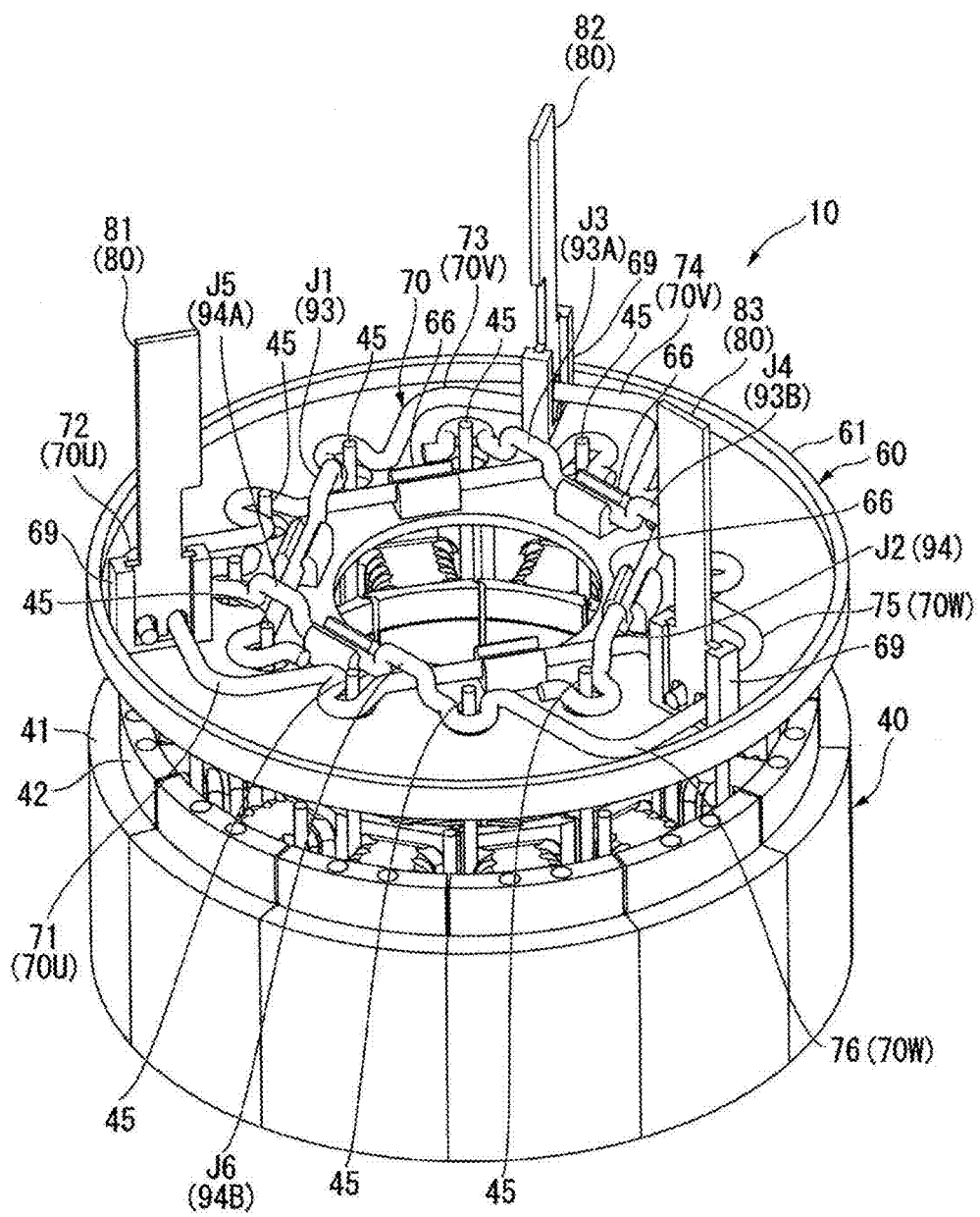
FIG. 1 is a perspective exploded view illustrating a stator and a bus bar unit of a motor according to an example embodiment of the present disclosure.
Figure 2:
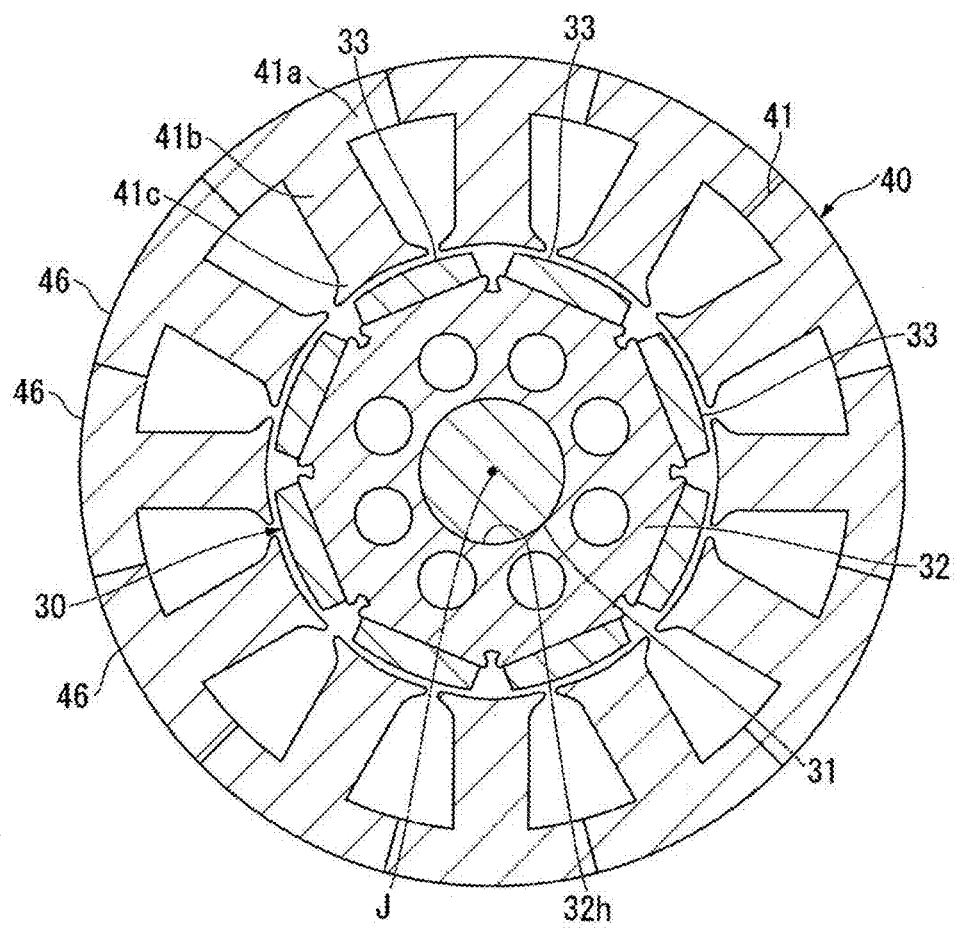
FIG. 2 is a cross-sectional plan view illustrating a configuration of a stator according to an example embodiment of the present disclosure.
Figure 3:
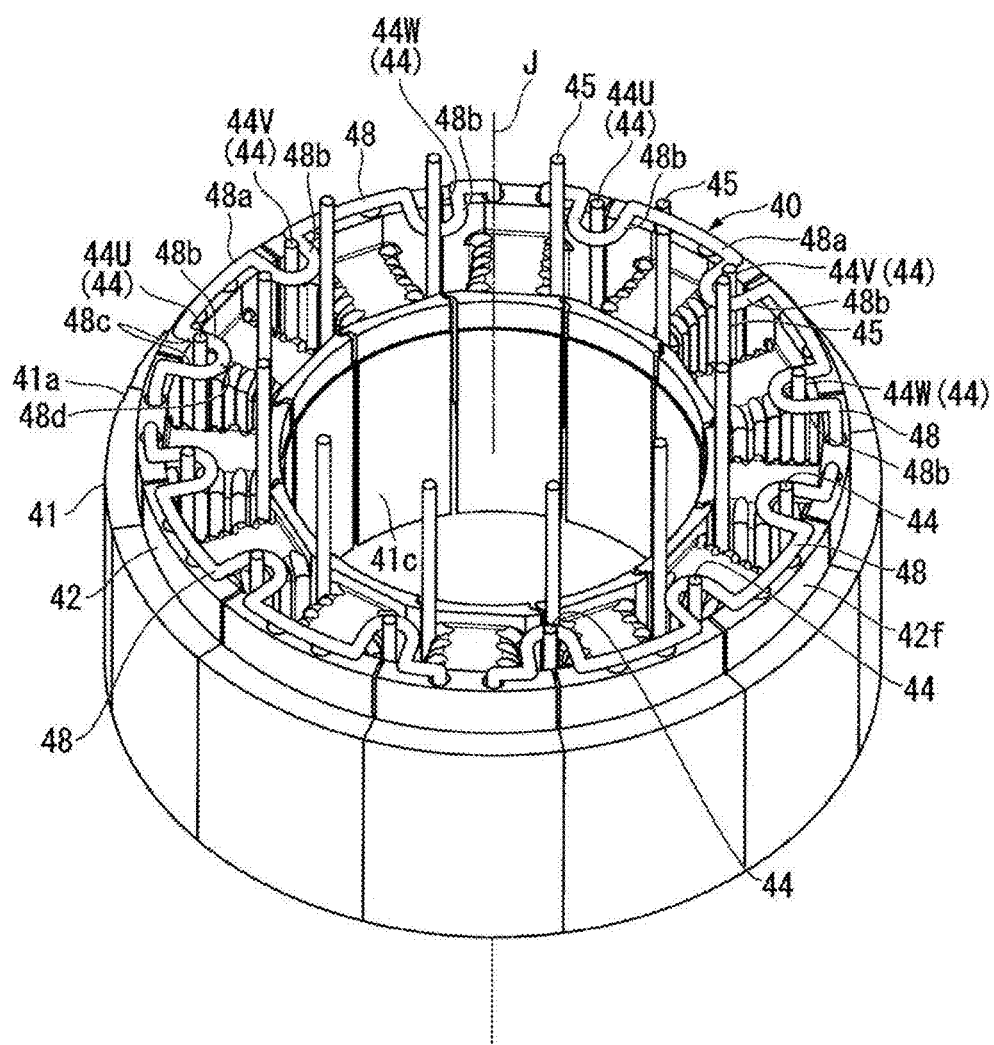
FIG. 3 is a perspective view illustrating the configuration of a stator according to an example embodiment of the present disclosure.

FIG. 1 is a perspective exploded view illustrating a stator and a bus bar unit of a motor according to the present example embodiment. FIG. 2 is a cross-sectional plan view illustrating a configuration of the stator according to the example embodiment. FIG. 3 is a perspective view illustrating the configuration of the stator according to the example embodiment. Further, in FIG. 1, FIG. 2, and FIG. 3, a specific drawing of coils is omitted.

As shown in FIG. 1, a motor 10 of the present example embodiment includes a rotor 30 (see FIG. 2), a stator 40, a housing (not shown), and a bus bar unit 60.

As shown in FIG. 2, the rotor 30 includes a shaft 31 and a rotor core 32. The shaft 31 is disposed along a central axis J extending in a vertical direction.

In the following description, a direction parallel to the central axis J is simply referred to as a "vertical direction" (axial direction), a radial direction about the central axis J is simply referred to as a "radial direction", and a circumferential direction about the central axis J is simply referred to as a "circumferential direction". Further, an upper side in FIG. 1 in the vertical direction is simply referred to as an "upper side", and a lower side in FIG. 1 in the vertical direction is simply referred to as a "lower side". Further, the upper side, the lower side, and the vertical direction are simply names for describing the relative positional relationship of each part, and the actual arrangement relationship or the like is not limited.

The rotor core 32 is a cylindrical member. When viewed in the vertical direction, an outer shape of the rotor core 32 is a polygonal shape. In the present example embodiment, the outer shape of the rotor core 32 is an octagonal shape. That is, in the present example embodiment, the rotor core 32 is an approximately hollow octagonal column. Further, the rotor core 32 may be a cylinder or the like. The rotor core 32 is a laminated steel plate in which a plurality of electromagnetic steel plates are laminated in the vertical direction.

The rotor core 32 includes a shaft through hole 32h at a center thereof. The shaft 31 passes through the shaft through hole 32h. The shaft 31 may be fixed to the rotor core 32 by press-fitting, adhesion, or the like, or may be fixed by a resin member or the like. That is, the shaft 31 is fixed directly or indirectly to the rotor core 32. The shaft 31 may be a hollow member and is not particularly limited.

In the present example embodiment, a dimension of the rotor core 32 in the vertical direction is the same as a dimension of a stator core 41 in the vertical direction, which is to be described below. However, the dimension of the rotor core 32 may be different from the dimension of the stator core 41.

A plurality of magnets 33 are disposed on each outer side surface of the rotor core 32. The magnet 33 is a plate-shaped member extending in the vertical direction. Adjacent magnets 33 face each other in a circumferential direction. The magnet 33 located on one side in the circumferential direction faces the magnet 33 located on the other side in the circumferential direction with a gap in the circumferential direction.

In the present example embodiment, a dimension of the magnet 33 in the vertical direction is the same as the dimension of the rotor core 32 in the vertical direction. An upper surface of the magnet 33 is flush with an upper surface of the rotor core 32. A lower surface of the magnet 33 is flush with a lower surface of the rotor core 32. That is, the dimension of the magnet 33 in the vertical direction is the same as the dimension of the stator core 41 in the vertical direction. In addition, the dimension of the magnet 33 in the vertical direction may be different from the dimension of the stator core 41 in the vertical direction.

The stator 40 is disposed on an outer side of the rotor 30 in a radial direction. As shown in FIGS. 2 and 3, the stator 40 is disposed around the central axis J in an annular shape. The stator 40 is accommodated in the housing (not shown) having a cylindrical shape. The stator 40 includes the stator core 41 having an annular shape, an insulator 42 mounted on the stator core 41, and coils (not shown) mounted on the stator core 41 through the insulator 42.

The stator core 41 is a laminated steel plate in which a plurality of electromagnetic steel plates are laminated in the vertical direction. The stator core 41 includes a core back part 41a having an annular shape and a plurality of teeth 41b. In the present example embodiment, the stator core 41 is a so-called split core. The core back part 41a is configured by connecting a plurality of fan-shaped core pieces 46 in the circumferential direction. The tooth 41b is provided on an inner circumferential surface of each of the core pieces 46. The tooth 41b extends inward in the radial direction from the inner circumferential surface of the core piece 46. The teeth 41b are arranged at equal intervals in the circumferential direction on an inner side surface of the core back part 41a. The tooth 41b faces the magnet 33 of the rotor 30 in the radial direction. The tooth 41b includes an umbrella 41c at an inner end thereof in the radial direction. The umbrella 41c extends from the inner end of the tooth 41b in the radial direction to both sides in the circumferential direction. A gap is formed between adjacent umbrellas 41c in the circumferential direction.

Further, the stator core 41 is not limited to the split core and may be other types of cores such as a so-called straight core or round core.

The material of the insulator 42 has insulation. In the present example embodiment, the material of the insulator 42 is an insulating resin. The insulator 42 covers at least a portion of an outer circumferential surface of the tooth 41b.

The insulator 42 includes a flange part 42f on an upper side of the stator 40. The flange part 42f is located on an outer side of the insulator 42 in the radial direction. The flange part 42f has a predetermined height in the vertical direction and extends in the circumferential direction.

Further, the material of the insulator 42 is not limited to the resin and any other material may be used as long as it has insulation.

The motor 10 of the present example embodiment is a so-called three-phase motor having three phases of a U-phase, a V-phase, and a W-phase. The coils (not shown) include four U-phase coils, four V-phase coils, and four W-phase coils. In the present example embodiment, a coil connection method is a so-called Y-connection method. The U-phase coils, the V-phase coils, and the W-phase coils are arranged adjacent to each other in this order in the circumferential direction. In the present example embodiment, there are four sets of coils, each including the U-phase coil, the V-phase coil, and the W-phase coil.

In the coil (not shown), a coil wire is wound around the tooth 41b through the insulator 42.

As shown in FIG. 3, each coil (the U-phase coil, the V-phase coil, and the W-phase coil) includes a first lead wire 44 and a second lead wire 45. The first lead wire 44 and the second lead wire 45 extend upward. In each coil, the first lead wire 44 is located on an outer side of the radial direction with respect to the second lead wire 45. Further, in each coil, the second lead wire 45 extends upward longer than the first lead wire 44 in the vertical direction. In the present example embodiment, one first lead wire 44 and one second lead wire 45 are drawn out from each coil. In the present example embodiment, the number of teeth 41b is twelve. Thus, the number of coils 43 is twelve. The number of first lead wires 44 is twelve, and the number of second lead wires 45 is twelve.

The first lead wires of the U-phase coil, the V-phase coil, and the W-phase coil of each set are electrically connected to each other by a neutral point bus bar 48. The neutral point bus bar 48 is held by the flange part 42f of the insulator 42. The neutral point bus bar 48 is formed by bending a conductive metal wire. In the present example embodiment, four neutral point bus bars 48 are arranged at equal intervals in the circumferential direction.

Each of the neutral point bus bars 48 includes a bus bar main body 48a and a coil wire holding part 48b. The bus bar main body 48a has an arc shape extending in the circumferential direction when viewed in the vertical direction.

The coil wire holding parts 48b are provided at a plurality of places spaced in a circumferential direction of the bus bar main body 48a. In the present example embodiment, the coil wire holding parts 48b are provided at four places of the bus bar main body 48a. Each of the coil wire holding parts 48b has a U-shape that opens outward in the radial direction. Each coil wire holding part 48b includes a pair of stretched parts 48c, 48c and a connection part 48d. The pair of stretched parts 48c, 48c extend inward in the radial direction from the bus bar main body 48a. The connection part 48d connects inner side ends of the pair of stretched parts 48c, 48c in the radial direction to each other. The connection part 48d has a semicircular arc shape.

The first lead wires 44 of the U-phase coil, the V-phase coil, and the W-phase coil of each set are electrically connected to each neutral point bus bar 48. A front end of each of a first lead wire 44U of the U-phase coil, a first lead wire 44V of the V-phase coil, and a first lead wire 44W of the W-phase coil is located on an inner side of the coil wire holding part 48b. In this manner, ends of the three first lead wires 44U, 44V, and 44W drawn out from the U-phase coil, the V-phase coil, and the W-phase coil of each set are electrically connected to one neutral point bus bar 48. Each coil wire holding part 48b and the first lead wire 44 are fixed by caulking. Further, each coil wire holding part 48b and the end of the first lead wire 44 are firmly fixed by laser welding or the like.

Figure 4:
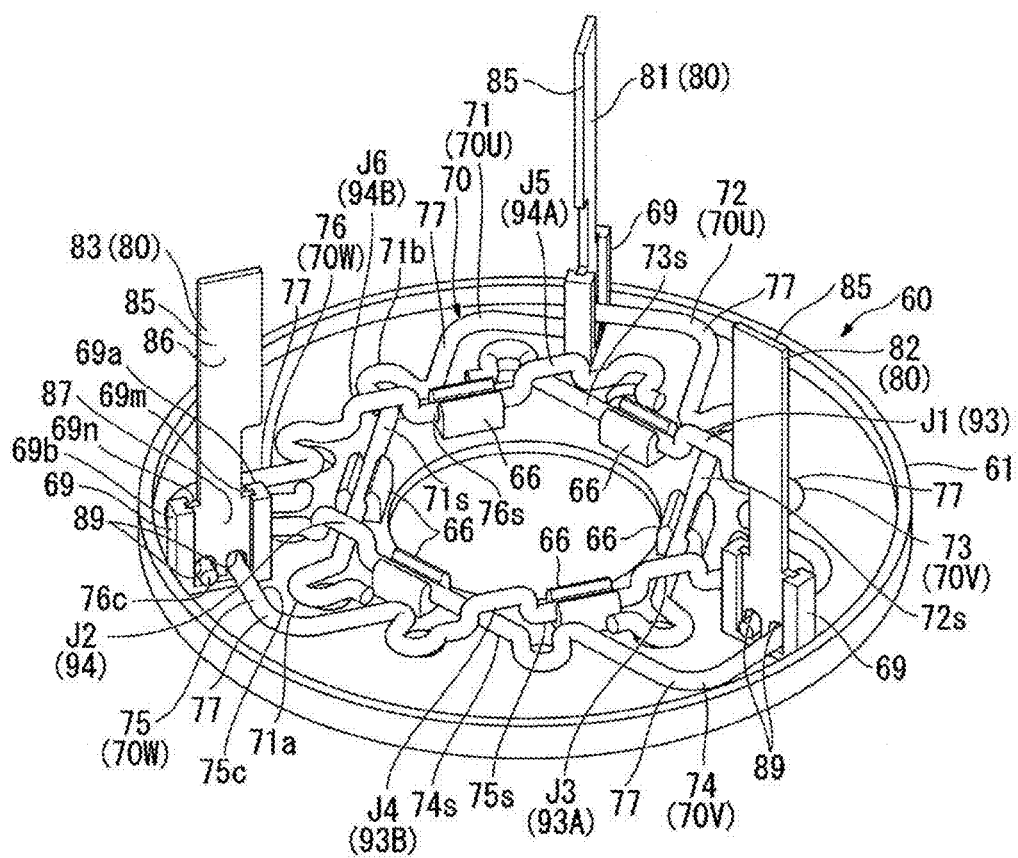
FIG. 4 is a perspective view illustrating a bus bar unit according to an example embodiment of the present disclosure.

FIG. 4 is a perspective view illustrating the bus bar unit according to the example embodiment.

As shown in FIG. 4, the bus bar unit 60 has an approximately circular plate shape in which the entire bus bar unit 60 expands in the radial direction. The bus bar unit 60 includes bus bars 70 and a bus bar holder 61.

The bus bar holder 61 is provided on one side of the stator 40 in the vertical direction. In the present example embodiment, the bus bar holder 61 is disposed on the upper side of the stator 40.

The bus bar holder 61 is made of an insulating material. In the present example embodiment, the material of the bus bar holder 61 is an insulating resin. However, the material of the bus bar holder 61 may be other insulating materials.

Figure 5:
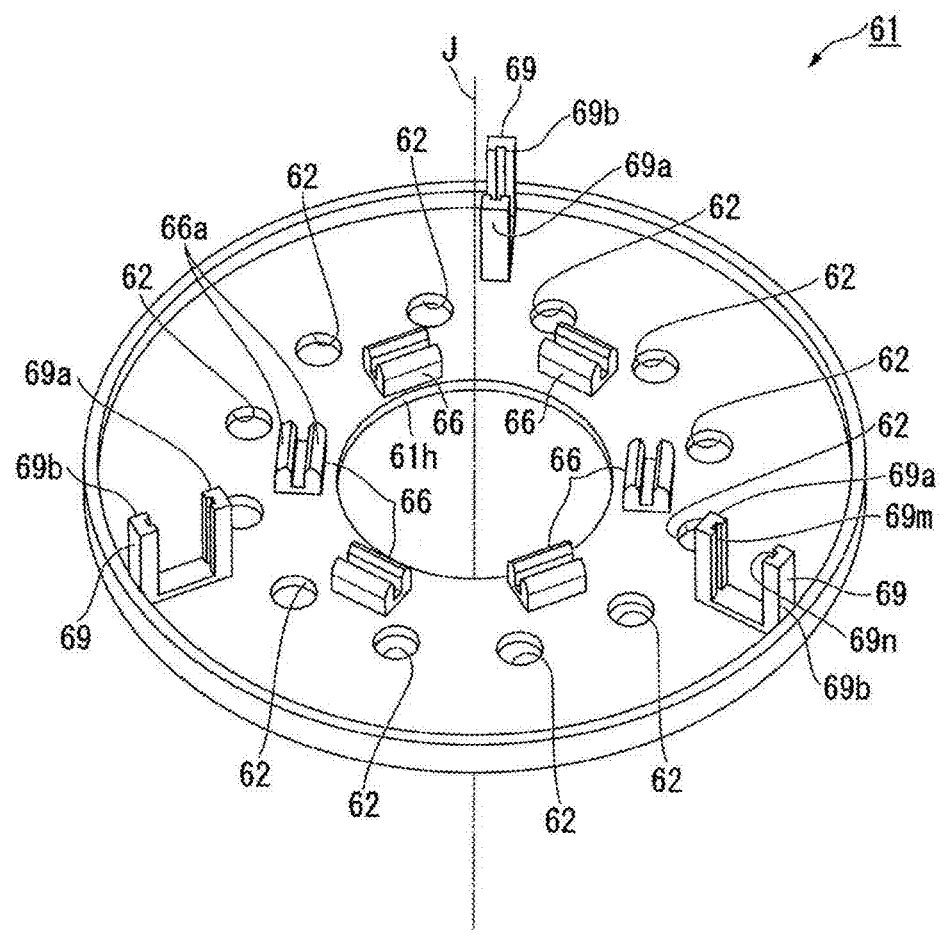
FIG. 5 is a perspective view illustrating a bus bar holder according to an example embodiment of the present disclosure.

FIG. 5 is a perspective view illustrating the bus bar holder according to the example embodiment.

As shown in FIG. 5, the bus bar holder 61 is an approximately plate-shaped member. When viewed in the vertical direction, an outer shape of the bus bar holder 61 is an approximately circular shape. The bus bar holder 61 has a rotationally symmetrical shape at every 120° centered on the central axis J. The bus bar holder 61 includes a through hole 61h passing through a center portion thereof in the vertical direction. The bus bar holder 61 is fitted into an inner side of the housing (not shown) in the radial direction.

The bus bar holder 61 includes a lead wire insertion hole 62. The lead wire insertion hole 62 passes through the bus bar holder 61 in the vertical direction. A plurality of lead wire insertion holes 62 are provided at intervals in the circumferential direction. In the present example embodiment, the number of lead wire insertion holes 62 is the same as the number of second lead wires 45. That is, the number of lead wire insertion holes 62 is twelve.

The bus bar holder 61 includes a clamping part 66 and a terminal holding part 69 on an upper surface thereof.

The clamping part 66 is provided on an outer side of the through hole 61h of the bus bar holder 61 in the radial direction. The clamping part 66 is provided on the inner side in the radial direction with respect to the lead wire insertion hole 62. A plurality of clamping parts 66 are provided at intervals in the circumferential direction. In the present example embodiment, six clamping parts 66 are provided at equal intervals in the circumferential direction. Each of the clamping parts 66 includes a pair of claw members 66a. Each of the claw members 66a extends upward. The pair of claw members 66a face each other with a gap in the radial direction. Each of the pair of claw members 66a includes a protrusion (not shown) at a front end thereof protruding in a direction in which the claw members 66a face each other. A separation distance between the protrusions of the pair of claw members 66a is narrower than an outer diameter of a wire 77 of the bus bar 70 to be described below. Thus, the clamping part 66 holds the wire 77 of the bus bar 70 by snap fitting.

The terminal holding part 69 is provided on an outer circumference of the bus bar holder 61. A plurality of terminal holding parts 69 are provided in the circumferential direction. In the present example embodiment, three terminal holding parts 69 are provided at intervals in the circumferential direction. Each of the terminal holding parts 69 includes a pair of columnar members 69a and 69b. The pair of columnar members 69a and 69b face each other at an interval in the radial direction. Each of the columnar members 69a and 69b extends upward from an upper surface of the bus bar holder 61. The columnar members 69a and 69b include holding grooves 69m and 69n, respectively. The holding grooves 69m and 69n are provided on inner sides of the columnar members 69a and 69b, which face each other in an opposite direction. The holding grooves 69m and 69n extend in the vertical direction. Upper ends of the holding grooves 69m and 69n are open upward at upper ends of the columnar members 69a and 69b.

As shown in FIG. 1, the bus bar holder 61 is located above the first lead wire 44 extending upward from each coil of the stator 40. The second lead wire 45 passes through the lead wire insertion hole 62 and protrudes to the upper surface side of the bus bar holder 61.

Figure 6:
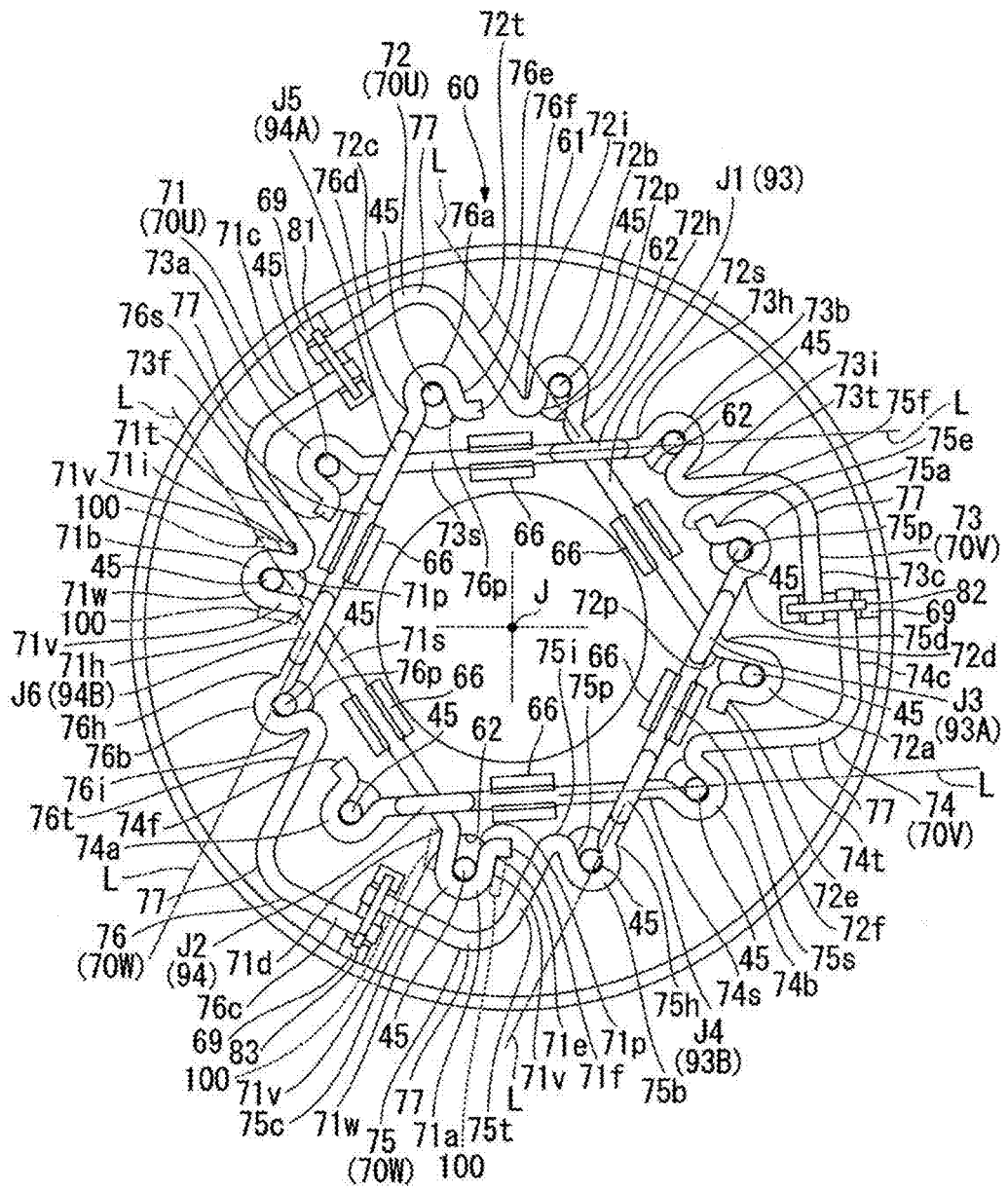
FIG. 6 is a plan view illustrating a state in which bus bars are assembled to a bus bar holder according to an example embodiment of the present disclosure.

FIG. 6 is a plan view illustrating a state in which the bus bars are assembled to the bus bar holder according to the example embodiment.

As shown in FIGS. 5 and 6, the bus bars 70 are located on an upper side of the bus bar holder 61. The bus bars 70 are fixed to the bus bar holder 61. The bus bars 70 include a U-phase bus bar group (first type bus bar) 70U, a V-phase bus bar group (second type bus bar) 70V, and a W-phase bus bar group (third type bus bar) 70W.

The U-phase bus bar group 70U includes a U-phase first bus bar 71 and a U-phase second bus bar 72. The V-phase bus bar group 70V includes a V-phase first bus bar 73 and a V-phase second bus bar 74. The W-phase bus bar group 70W includes a W-phase first bus bar 75 and a W-phase second bus bar 76.

Each of the U-phase first bus bar 71, the U-phase second bus bar 72, the V-phase first bus bar 73, the V-phase second bus bar 74, the W-phase first bus bar 75, and the W-phase second bus bar 76 extends along a plane perpendicular to the vertical direction.

Each of the U-phase first bus bar 71, the U-phase second bus bar 72, the V-phase first bus bar 73, the V-phase second bus bar 74, the W-phase first bus bar 75, and the W-phase second bus bar 76 is composed of the wire 77 having a circular cross-section. The wire 77 is made of a conductive metal material. Each of the U-phase first bus bar 71, the U-phase second bus bar 72, the V-phase first bus bar 73, the V-phase second bus bar 74, the W-phase first bus bar 75, and the W-phase second bus bar 76 is formed by bending the wire 77 using a forming machine. The forming machine bends the wire 77 at a predetermined position while feeding out the wire 77. In the forming machine, a bending position, a bending direction, the curvature of a bending portion, and the like of the wire 77 may be set in advance. In this manner, the U-phase first bus bar 71, the U-phase second bus bar 72, the V-phase first bus bar 73, the V-phase second bus bar 74, the W-phase first bus bar 75, and the W-phase second bus bar 76 are automatically manufactured by the forming machine on the basis of the preset programming.

Figure 7:
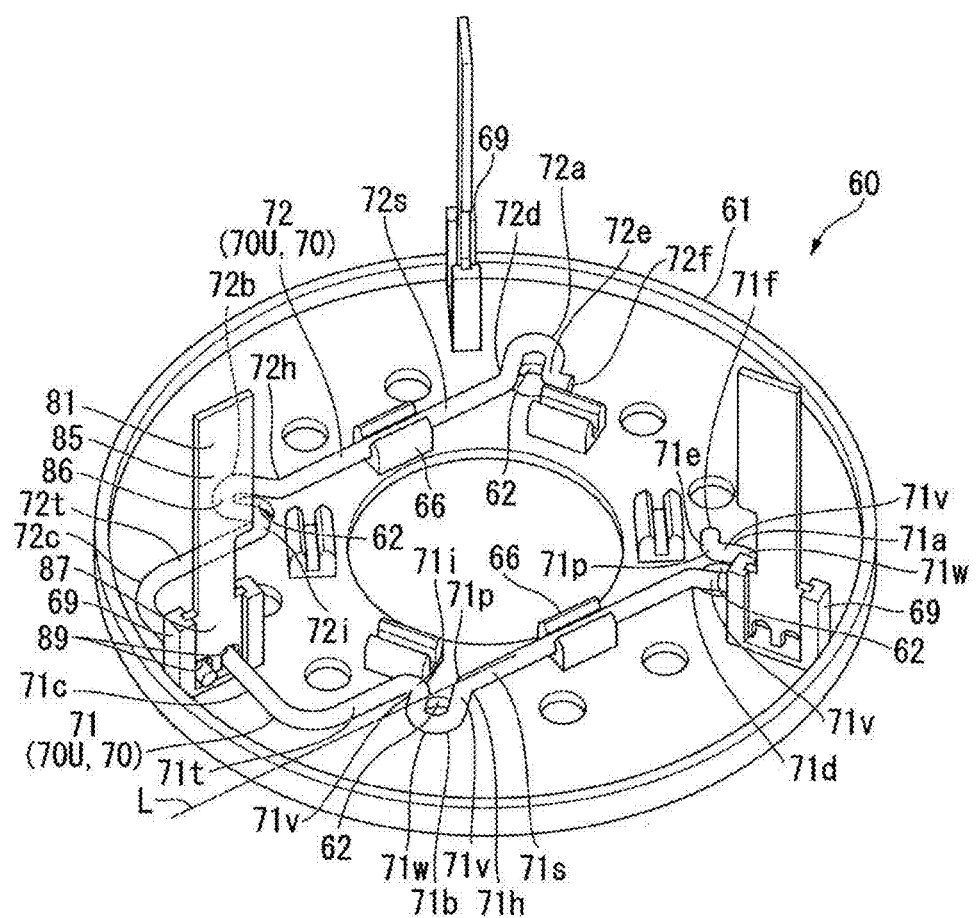
FIG. 7 is a perspective view illustrating a state in which a U-phase bus bar group is assembled to a bus bar holder according to an example embodiment of the present disclosure.

FIG. 7 is a perspective view illustrating a state in which the U-phase bus bar group is assembled to the bus bar holder according to the example embodiment.

As shown in FIGS. 6 and 7, the U-phase first bus bar 71 includes a first linear part 71s, a second linear part 71t, a terminal connection part 71c, a first lead wire connection part (lead wire connection part) 71a, and a second lead wire connection part (lead wire connection part) 71b.

The first linear part 71s is provided between the first lead wire connection part 71a and the second lead wire connection part 71b. The first linear part 71s connects the first lead wire connection part 71a to the second lead wire connection part 71b. The first linear part 71s has a linear shape when viewed in the vertical direction. The first linear part 71s extends in a direction perpendicular to the radial direction.

The second linear part 71t is provided between the second lead wire connection part 71b and the terminal connection part 71c. The second linear part 71t extends from a fourth end 71i to be described below. The second linear part 71t has a linear shape when viewed in the vertical direction. The second linear part 71t is parallel to the first linear part 71s. The second linear part 71t is disposed to be shifted inward in the radial direction with respect to an imaginary line L extending the first linear part 71s.

The terminal connection part 71c is located on one end of the U-phase first bus bar 71. The terminal connection part 71c is bent about 90° inward in the radial direction from an end of the second linear part 71t, and extends in a direction perpendicular to the radial direction. The terminal connection part 71c is connected to a U-phase external connection terminal 81.

The first lead wire connection part 71a is located on the other end of the U-phase first bus bar 71. The first lead wire connection part 71a includes a pair of stretched parts 71v and a curved part 71w. The pair of stretched parts 71v extend parallel to each other along the radial direction. The pair of stretched parts 71v are disposed on both sides of the lead wire insertion hole 62 of the bus bar holder 61 with the lead wire insertion hole 62 of the bus bar holder 61 interposed therebetween. The curved part 71w connects outer ends of the pair of stretched parts 71v in the radial direction. The curved part 71w has a semicircular arc shape and curves along an inner circumference edge of the lead wire insertion hole 62. As described above, the first lead wire connection part 71a has a U-shape that opens inward in the radial direction. The first lead wire connection part 71a includes an opening 71p that opens inward in the radial direction. The first lead wire connection part 71a is connected to the second lead wire 45 protruding upward from the bus bar holder 61. The second lead wire 45 is located on an inner side of the first lead wire connection part 71a. The second lead wire 45 is joined to the first lead wire connection part 71a by laser welding or the like.

The first lead wire connection part 71a further includes a first end 71d and a second end 71e. The first end 71d is connected to an end of the first linear part 71s. The second end 71e is located on the opposite side of the first end 71d. The second end 71e is provided with an extending part 71f extending in a direction away from the opening 71p of the first lead wire connection part 71a. The extending part 71f extends in a direction perpendicular to the radial direction.

The second lead wire connection part 71b is located between the terminal connection part 71c and the first lead wire connection part 71a. The second lead wire connection part 71b is located between the second linear part 71t and the first linear part 71s. The second lead wire connection part 71b has the same shape as the first lead wire connection part 71a. That is, the second lead wire connection part 71b includes a pair of stretched parts 71v and a curved part 71w. As described above, the second lead wire connection part 71b has a U-shape that opens inward in the radial direction. The second lead wire connection part 71b includes an opening 71p that opens inward in the radial direction.

The second lead wire connection part 71b is connected to a second lead wire 45 protruding upward from the bus bar holder 61. The second lead wire 45 is located on an inner side of the second lead wire connection part 71b. The second lead wire 45 is joined to the second lead wire connection part 71b by laser welding or the like.

The second lead wire connection part 71b further includes a third end 71h and the fourth end 71i. The third end 71h is connected to the end of the first linear part 71s. The fourth end 71i is located on the opposite side of the third end 71h. The fourth end 71i is connected to an end of the second linear part 71t.

The U-phase first bus bar 71 is held by a clamping part 66 at the first linear part 71s. In other words, the U-phase first bus bar 71 is held by the clamping part 66 between the first lead wire connection part 71a and the second lead wire connection part 71b. The first lead wire connection part 71a and the second lead wire connection part 71b are arranged on a concentric circle centered on the central axis J when viewed in the vertical direction.

The U-phase second bus bar 72 includes a first linear part 72s, a second linear part 72t, a terminal connection part 72c, a first lead wire connection part (lead wire connection part) 72a, and a second lead wire connection part (lead wire connection part) 72b.

The first linear part 72s is provided between the first lead wire connection part 72a and the second lead wire connection part 72b. The first linear part 72s connects the first lead wire connection part 72a to the second lead wire connection part 72b. The first linear part 72s has a linear shape when viewed in the vertical direction. The first linear part 72s extends in a direction perpendicular to the radial direction.

The second linear part 72t is provided between the second lead wire connection part 72b and the terminal connection part 72c. The second linear part 72t extends from a fourth end 72i to be described below. The second linear part 72t has a linear shape when viewed in the vertical direction. The second linear part 72t is parallel to the first linear part 72s. The second linear part 72t is disposed to be shifted inward in the radial direction with respect to an imaginary line L extending the first linear part 72s.

The terminal connection part 72c is located on one end of the U-phase second bus bar 72. The terminal connection part 72c is bent about 90° inward in the radial direction from an end of the second linear part 72t, and extends in a direction perpendicular to the radial direction. The terminal connection part 72c is disposed to be shifted outward in the radial direction with respect to the terminal connection part 71c of the U-phase first bus bar 71. The terminal connection part 72c is disposed parallel to the terminal connection part 71c of the U-phase first bus bar 71. The terminal connection part 72c is connected to the U-phase external connection terminal 81.

The first lead wire connection part 72a is located on the other end of the U-phase second bus bar 72. The first lead wire connection part 72a has the same shape as the first lead wire connection part 71a. The first lead wire connection part 72a has a U-shape that opens inward in the radial direction. The first lead wire connection part 72a includes an opening 72p that opens inward in the radial direction. The first lead wire connection part 72a is connected to a second lead wire 45 protruding upward from the bus bar holder 61. The second lead wire 45 is located on an inner side of the first lead wire connection part 72a. The second lead wire 45 is joined to the first lead wire connection part 72a by laser welding or the like.

The first lead wire connection part 72a further includes a first end 72d and a second end 72e. The first end 72d is connected to an end of the first linear part 72s. The second end 72e is located on the opposite side of the first end 72d. The second end 72e is provided with an extending part 72f extending in a direction away from the opening 72p of the first lead wire connection part 72a. The extending part 72f extends in a direction perpendicular to the radial direction.

The second lead wire connection part 72b is located between the terminal connection part 72c and the first lead wire connection part 72a. The second lead wire connection part 72b is located between the second linear part 72t and the first linear part 72s. The second lead wire connection part 72b has the same shape as the second lead wire connection part 71b. The second lead wire connection part 72b has a U-shape that opens inward in the radial direction. The second lead wire connection part 72b includes an opening 72p that opens inward in the radial direction. The second lead wire connection part 72b is connected to a second lead wire 45 protruding upward from the bus bar holder 61. The second lead wire 45 is located on an inner side of the second lead wire connection part 72b. The second lead wire 45 is joined to the second lead wire connection part 72b by laser welding or the like.

The second lead wire connection part 72b further includes a third end 72h and the fourth end 72i. The third end 72h is connected to an end of the first linear part 72s. The fourth end 72i is located on the opposite side of the third end 72h. The fourth end 72i is connected to an end of the second linear part 72t.

The U-phase second bus bar 72 is held by a clamping part 66 at the first linear part 72s. In other words, the U-phase second bus bar 72 is held by the clamping part 66 between the first lead wire connection part 72a and the second lead wire connection part 72b. The U-phase first bus bar 71 and the U-phase second bus bar 72 are held along the upper surface of the bus bar holder 61. The U-phase first bus bar 71 and the U-phase second bus bar 72 may be spaced apart from the upper surface of the bus bar holder 61 or may be in contact with the upper surface of the bus bar holder 61.

In the entire U-phase first bus bar 71 and the entire U-phase second bus bar 72 including the first linear part 71s, the terminal connection part 71c and the first lead wire connection part 71a, and the first linear part 72s, the terminal connection part 72c and the first lead wire connection part 72a respectively, vertical positions coincide with each other.

The first lead wire connection part 72a and the second lead wire connection part 72b are arranged on a concentric circle centered on the central axis J when viewed in the vertical direction. Further, the first lead wire connection part 72a and the second lead wire connection part 72b, and the first lead wire connection part 71a and the second lead wire connection part 71b of the U-phase first bus bar 71 are arranged on a concentric circle centered on the central axis J when viewed in the vertical direction.

In the U-phase first bus bar 71 and the U-phase second bus bar 72, the first linear part 71s and the first linear part 72s are located on the opposite sides with respect to the central axis J. Further, in the U-phase first bus bar 71 and the U-phase second bus bar 72, the first linear part 71s and the first linear part 72s extend in parallel.

Further, the U-phase first bus bar 71 and the U-phase second bus bar 72 extend to mutually opposite sides in the circumferential direction from the U-phase external connection terminal 81 connected thereto.

As a result, a magnetic field generated by the U-phase first bus bar 71 and a magnetic field generated by the U-phase second bus bar 72 cancel each other, so that influence on the outside is suppressed.

Figure 8:
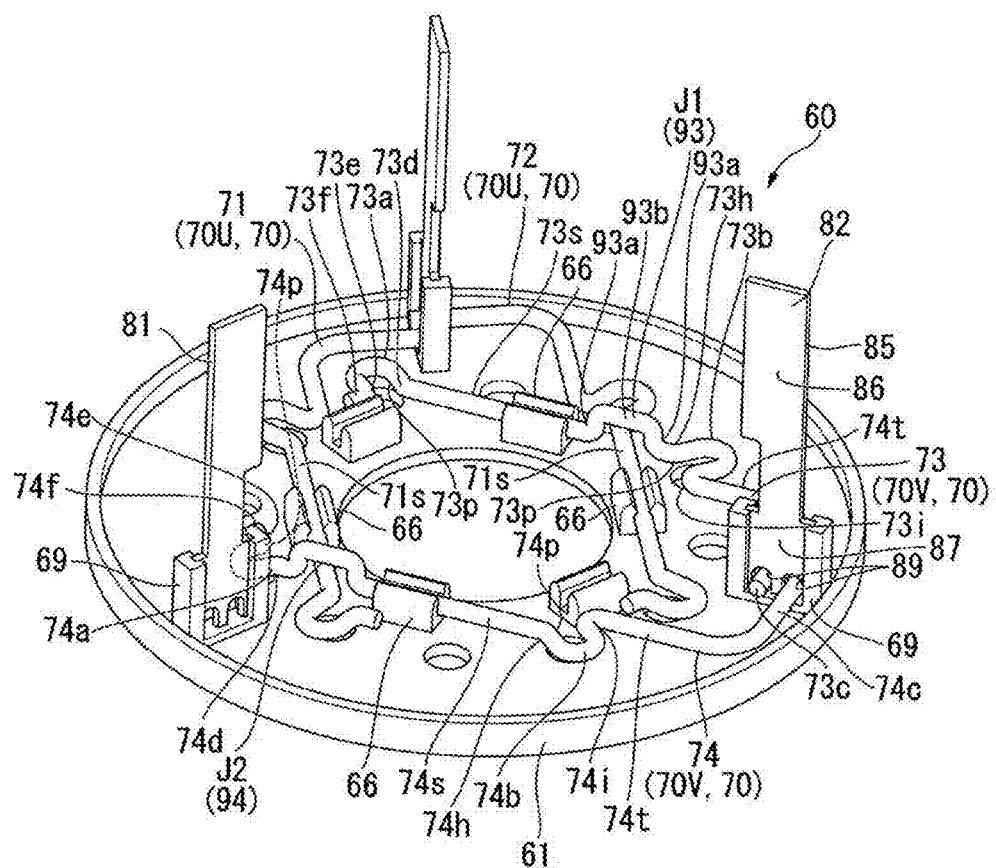
FIG. 8 is a perspective view illustrating a state in which a U-phase bus bar group and a V-phase bus bar group are assembled to a bus bar holder according to an example embodiment of the present disclosure.

FIG. 8 is a perspective view illustrating a state in which the U-phase bus bar group and the V-phase bus bar group are assembled to the bus bar holder according to the example embodiment.

As shown in FIGS. 6 and 8, the V-phase first bus bar 73 includes a first linear part 73s, a second linear part 73t, a terminal connection part 73c, a first lead wire connection part (lead wire connection part) 73a, and a second lead wire connection part (lead wire connection part) 73b.

The first linear part 73s is provided between the first lead wire connection part 73a and the second lead wire connection part 73b. The first linear part 73s connects the first lead wire connection part 73a to the second lead wire connection part 73b. The first linear part 73s has a linear shape when viewed in the vertical direction. The first linear part 73s extends in a direction perpendicular to the radial direction.

The second linear part 73t is provided between the second lead wire connection part 73b and the terminal connection part 73c. The second linear part 73t extends from a fourth end 73i to be described below. The second linear part 73t has a linear shape when viewed in the vertical direction. The second linear part 73t is parallel to the first linear part 73s. The second linear part 73t is disposed to be shifted inward in the radial direction with respect to an imaginary line L extending the first linear part 73s.

The terminal connection part 73c is located on one end of the V-phase first bus bar 73. The terminal connection part 73c is bent about 90° inward in the radial direction from an end of the second linear part 73t, and extends in a direction perpendicular to the radial direction. The terminal connection part 73c is connected to a V-phase external connection terminal 82.

The first lead wire connection part 73a is located on the other end of the V-phase first bus bar 73. The first lead wire connection part 73a has the same shape as the first lead wire connection part 71a. The first lead wire connection part 73a has a U-shape that opens inward in the radial direction.

The first lead wire connection part 73a is connected to a second lead wire 45 protruding upward from the bus bar holder 61. The second lead wire 45 is located on an inner side of the first lead wire connection part 73a. The second lead wire 45 is joined to the first lead wire connection part 73a by laser welding or the like.

The first lead wire connection part 73a further includes a first end 73d and a second end 73e. The first end 73d is connected to an end of the first linear part 73s. The second end 73e is located on the opposite side of the first end 73d. The second end 73e is provided with an extending part 73f extending in a direction away from an opening 73p of the first lead wire connection part 73a. The extending part 73f extends in a direction perpendicular to the radial direction.

The second lead wire connection part 73b is located between the terminal connection part 73c and the first lead wire connection part 73a. The second lead wire connection part 73b is located between the second linear part 73t and the first linear part 73s. The second lead wire connection part 73b has the same shape as the second lead wire connection part 71b. The second lead wire connection part 73b has a U-shape that opens inward in the radial direction. The second lead wire connection part 73b includes an opening 73p that opens inward in the radial direction.

The second lead wire connection part 73b is connected to a second lead wire 45 protruding upward from the bus bar holder 61. The second lead wire 45 is located on an inner side of the second lead wire connection part 73*b*. The second lead wire 45 is joined to the second lead wire connection part 73*b* by laser welding or the like.

The second lead wire connection part 73*b* further includes a third end 73*h* and the fourth end 73*i*. The third end 73*h* is connected to an end of the first linear part 73*s*. The fourth end 73*i* is located on the opposite side of the third end 73*h*. The fourth end 73*i* is connected to an end of the second linear part 73*t*.

The V-phase first bus bar 73 is held by a clamping part 66 at the first linear part 73*s*. In other words, the V-phase first bus bar 73 is held by the clamping part 66 between the first lead wire connection part 73*a* and the second lead wire connection part 73*b*.

The first lead wire connection part 73*a* and the second lead wire connection part 73*b* are arranged on a concentric circle centered on the central axis J when viewed in the vertical direction.

The V-phase first bus bar 73 includes a cross part J1 crossing a portion of the U-phase second bus bar 72 when viewed in the vertical direction. The V-phase first bus bar 73 includes a retracting part 93 at the cross part J1. The retracting part 93 passes above the U-phase second bus bar 72 where the retracting part 93 intersects. The retracting part 93 passes above the first linear part 72*s* of the U-phase second bus bar 72. The retracting part 93 is provided on the first linear part 73*s* of the V-phase first bus bar 73. The retracting part 93 is provided on the second lead wire connection part 73*b* side in the first linear part 73*s*. The retracting part 93 includes a pair of leg parts 93*a* and a bridge part 93*b*. The pair of leg parts 93*a* extend upward from the first linear part 73*s* and the second lead wire connection part 73*b*. The bridge part 93*b* connects upper-end portions of the pair of leg parts 93*a* to each other. The bridge part 93*b* is located above the first linear part 73*s*. The bridge part 93*b* extends parallel to the first linear part 73*s*. In this manner, the retracting part 93 straddles an upper side of the first linear part 72*s* of the U-phase second bus bar 72. The retracting part 93 is spaced apart from the first linear part 72*s* of the U-phase second bus bar 72.

The V-phase second bus bar 74 includes a first linear part 74*s*, a second linear part 74*t*, a terminal connection part 74*c*, a first lead wire connection part (lead wire connection part) 74*a*, and a second lead wire connection part (lead wire connection part) 74*b*.

The first linear part 74*s* is provided between the first lead wire connection part 74*a* and the second lead wire connection part 74*b*. The first linear part 74*s* connects the first lead wire connection part 74*a* to the second lead wire connection part 74*b*. The first linear part 74*s* has a linear shape when viewed in the vertical direction. The first linear part 74*s* extends in a direction perpendicular to the radial direction.

The second linear part 74*t* is provided between the second lead wire connection part 74*b* and the terminal connection part 74*c*. The second linear part 74*t* extends from a fourth end 74*i* to be described below. The second linear part 74*t* has a linear shape when viewed in the vertical direction. The second linear part 74*t* is parallel to the first linear part 74*s*. The second linear part 74*t* is disposed to be shifted inward in the radial direction with respect to an imaginary line L extending the first linear part 74*s*.

The terminal connection part 74*c* is located on one end of the V-phase second bus bar 74. The terminal connection part 74*c* is bent about 90° inward in the radial direction from an end of the second linear part 74*t*, and extends in a direction perpendicular to the radial direction. The terminal connection part 74*c* is disposed to be shifted outward in the radial direction with respect to the terminal connection part 73*c* of the V-phase first bus bar 73. The terminal connection part 74*c* is disposed parallel to the terminal connection part 73*c* of the V-phase first bus bar 73. The terminal connection part 74*c* is connected to the V-phase external connection terminal 82.

The first lead wire connection part 74*a* is located on the other end of the V-phase second bus bar 74. The first lead wire connection part 74*a* has the same shape as the first lead wire connection part 71*a*. The first lead wire connection part 74*a* has a U-shape that opens inward in the radial direction. The first lead wire connection part 74*a* includes an opening 74*p* that opens inward in the radial direction. The first lead wire connection part 74*a* is connected to a second lead wire 45 protruding upward from the bus bar holder 61. The second lead wire 45 is located on an inner side of the first lead wire connection part 74*a*. The second lead wire 45 is joined to the first lead wire connection part 74*a* by laser welding or the like.

The first lead wire connection part 74*a* further includes a first end 74*d* and a second end 74*e*. The first end 74*d* is connected to an end of the first linear part 74*s*. The second end 74*e* is located on the opposite side of the first end 74*d*. The second end 74*e* is provided with an extending part 74*f* extending in a direction away from the opening 74*p* of the first lead wire connection part 74*a*. The extending part 74*f* extends in a direction perpendicular to the radial direction.

The second lead wire connection part 74*b* is located between the terminal connection part 74*c* and the first lead wire connection part 74*a*. The second lead wire connection part 74*b* is located between the second linear part 74*t* and the first linear part 74*s*. The second lead wire connection part 74*b* has the same shape as the second lead wire connection part 71*b*. The second lead wire connection part 74*b* has a U-shape that opens inward in the radial direction. The second lead wire connection part 74*b* includes an opening 74*p* that opens inward in the radial direction.

The second lead wire connection part 74*b* is connected to a second lead wire 45 protruding upward from the bus bar holder 61. The second lead wire 45 is located on an inner side of the second lead wire connection part 74*b*. The second lead wire 45 is joined to the second lead wire connection part 74*b* by laser welding or the like.

The second lead wire connection part 74*b* further includes a third end 74*h* and the fourth end 74*i*. The third end 74*h* is connected to an end of the first linear part 74*s*. The fourth end 74*i* is located on the opposite side of the third end 74*h*. The fourth end 74*i* is connected to an end of the second linear part 74*t*.

The V-phase second bus bar 74 includes a cross part J2 crossing a portion of the U-phase first bus bar 71 when viewed in the vertical direction. The V-phase second bus bar 74 includes a retracting part 94 at the cross part J2. The retracting part 94 passes above the U-phase first bus bar 71 where the retracting part 94 intersects. The retracting part 94 passes above the first linear part 71*s* of the U-phase first bus bar 71. The retracting part 94 is provided on the first linear part 74*s* of the V-phase second bus bar 74. The retracting part 94 is provided on the first lead wire connection part 74*a* side in the first linear part 74*s*. The retracting part 94 has the same shape as the retracting part 93. The retracting part 94 straddles an upper side of the first linear part 71*s* of the U-phase first bus bar 71. The retracting part 94 is spaced apart from the first linear part 71*s* of the U-phase first bus bar 71.

The V-phase second bus bar 74 is held by a clamping part 66 at the first linear part 74s. In other words, the V-phase second bus bar 74 is held by the clamping part 66 between the first lead wire connection part 74a and the second lead wire connection part 74b. The V-phase first bus bar 73 and the V-phase second bus bar 74 are arranged at an angle different from the U-phase first bus bar 71 and the U-phase second bus bar 72 by 120° in the circumferential direction.

The V-phase first bus bar 73 and the V-phase second bus bar 74 held by the clamping parts 66 are arranged along the upper surface of the bus bar holder 61. The V-phase first bus bar 73 and the V-phase second bus bar 74 may be spaced apart from the upper surface of the bus bar holder 61 or may be in contact with the upper surface of the bus bar holder 61.

The vertical positions of the V-phase first bus bar 73 and the V-phase second bus bar 74 coincide with those of the U-phase first bus bar 71 and the U-phase second bus bar 72 at the first linear part 73s, the second linear part 73t, the terminal connection part 73c, the first lead wire connection part 73a, and the second lead wire connection part 73b, and the first linear part 74s, the second linear part 74t, the terminal connection part 74c, the first lead wire connection part 74a, and the second lead wire connection part 74b. In other words, the vertical positions of the V-phase first bus bar 73 and the V-phase second bus bar 74 coincide with those of the U-phase first bus bar 71 and the U-phase second bus bar 72 at portions other than the retracting parts 93 and 94.

The first lead wire connection part 74a and the second lead wire connection part 74b are arranged on a concentric circle centered on the central axis J when viewed in the vertical direction. Further, the first lead wire connection part 74a and the second lead wire connection part 74b, and the first lead wire connection part 73a and the second lead wire connection part 73b of the V-phase first bus bar 73 are arranged on a concentric circle centered on the central axis J when viewed in the vertical direction.

In the V-phase first bus bar 73 and the V-phase second bus bar 74, the first linear part 73s and the first linear part 74s are located on the opposite sides with respect to the central axis J. Further, in the V-phase first bus bar 73 and the V-phase second bus bar 74, the first linear part 73s and the first linear part 74s extend in parallel.

Further, the V-phase first bus bar 73 and the V-phase second bus bar 74 extend to mutually opposite sides in the circumferential direction from the V-phase external connection terminal 82 connected thereto.

As a result, a magnetic field generated by the V-phase first bus bar 73 and a magnetic field generated by the V-phase second bus bar 74 cancel each other, so that influence on the outside is suppressed.

As shown in FIG. 6, the W-phase first bus bar 75 includes a first linear part 75s, a second linear part 75t, a terminal connection part 75c, a first lead wire connection part (lead wire connection part) 75a, and a second lead wire connection part (lead wire connection part) 75b.

The first linear part 75s is provided between the first lead wire connection part 75a and the second lead wire connection part 75b. The first linear part 75s connects the first lead wire connection part 75a to the second lead wire connection part 75b. The first linear part 75s has a linear shape when viewed in the vertical direction. The first linear part 75s extends in a direction perpendicular to the radial direction.

The second linear part 75t is provided between the second lead wire connection part 75b and the terminal connection part 75c. The second linear part 75t extends from a fourth end 75i to be described below. The second linear part 75t has a linear shape when viewed in the vertical direction. The second linear part 75t is parallel to the first linear part 75s. The second linear part 75t is disposed to be shifted inward in the radial direction with respect to an imaginary line L extending the first linear part 75s.

The terminal connection part 75c is located on one end of the W-phase first bus bar 75. The terminal connection part 75c is bent about 90° inward in the radial direction from an end of the second linear part 75t, and extends in a direction perpendicular to the radial direction. The terminal connection part 75c is connected to a W-phase external connection terminal 83.

The first lead wire connection part 75a is located on the other end of the W-phase first bus bar 75. The first lead wire connection part 75a has the same shape as the first lead wire connection part 71a. The first lead wire connection part 75a has a U-shape that opens inward in the radial direction. The first lead wire connection part 75a includes an opening 75p that opens inward in the radial direction.

The first lead wire connection part 75a is connected to a second lead wire 45 protruding upward from the bus bar holder 61. The second lead wire 45 is located on an inner side of the first lead wire connection part 75a. The second lead wire 45 is joined to the first lead wire connection part 75a by laser welding or the like.

The first lead wire connection part 75a further includes a first end 75d and a second end 75e. The first end 75d is connected to an end of the first linear part 75s. The second end 75e is located on the opposite side of the first end 75d. The second end 75e is provided with an extending part 75f extending in a direction away from the opening 75p of the first lead wire connection part 75a. The extending part 75f extends in a direction perpendicular to the radial direction.

The second lead wire connection part 75b is located between the terminal connection part 75c and the first lead wire connection part 75a. The second lead wire connection part 75b is located between the second linear part 75t and the first linear part 75s. The second lead wire connection part 75b has the same shape as the second lead wire connection part 71b. The second lead wire connection part 75b has a U-shape that opens inward in the radial direction. The second lead wire connection part 75b includes an opening 75p that opens inward in the radial direction.

The second lead wire connection part 75b is connected to a second lead wire 45 protruding upward from the bus bar holder 61. The second lead wire 45 is located on an inner side of the second lead wire connection part 75b. The second lead wire 45 is joined to the second lead wire connection part 75b by laser welding or the like.

The second lead wire connection part 75b further includes a third end 75h and the fourth end 75i. The third end 75h is connected to an end of the first linear part 75s. The fourth end 75i is located on the opposite side of the third end 75h. The fourth end 75i is connected to an end of the second linear part 75t.

The W-phase first bus bar 75 is held by a clamping part 66 at the first linear part 75s. In other words, the W-phase first bus bar 75 is held by the clamping part 66 between the first lead wire connection part 75a and the second lead wire connection part 75b.

The first lead wire connection part 75a and the second lead wire connection part 75b are arranged on a concentric circle centered on the central axis J when viewed in the vertical direction.

The W-phase first bus bar 75 includes cross parts J3 and J4.

The cross part J3 intersects a portion of the U-phase second bus bar 72 when viewed in the vertical direction. The W-phase first bus bar 75 includes a retracting part 93A at the cross part J3. The retracting part 93A passes above the U-phase second bus bar 72 where the retracting part 93A intersects. The retracting part 93A passes above the first linear part 72s of the U-phase second bus bar 72. The retracting part 93A is provided on the first linear part 75s of the W-phase first bus bar 75. The retracting part 93A is provided on the first lead wire connection part 75a side in the first linear part 75s.

The cross part J4 intersects a portion of the V-phase second bus bar 74 when viewed in the vertical direction. The W-phase first bus bar 75 includes a retracting part 93B at the cross part J4. The retracting part 93B passes above the V-phase second bus bar 74 where the retracting part 93B intersects. The retracting part 93B passes above the first linear part 74s of the V-phase second bus bar 74. The retracting part 93B is provided on the first linear part 75s of the W-phase first bus bar 75. The retracting part 93B is provided on the second lead wire connection part 75b side in the first linear part 75s.

The retracting parts 93A and 93B have the same shape as the retracting part 93. The retracting parts 93A and 93B straddle upper sides of the first linear part 72s of the U-phase second bus bar 72 and the first linear part 74s of the V-phase second bus bar 74. The retracting part 93A and 93B is disposed at an interval between the first linear part 72s of the U-phase second bus bar 72 and the first linear part 74s of the V-phase second bus bar 74.

The W-phase second bus bar 76 includes a first linear part 76s, a second linear part 76t, a terminal connection part 76c, a first lead wire connection part (lead wire connection part) 76a, and a second lead wire connection part (lead wire connection part) 76b.

The first linear part 76s is provided between the first lead wire connection part 76a and the second lead wire connection part 76b. The first linear part 76s connects the first lead wire connection part 76a to the second lead wire connection part 76b. The first linear part 76s has a linear shape when viewed in the vertical direction. The first linear part 76s extends in a direction perpendicular to the radial direction.

The second linear part 76t is provided between the second lead wire connection part 76b and the terminal connection part 76c. The second linear part 76t extends from a fourth end 76i to be described below. The second linear part 76t has a linear shape when viewed in the vertical direction. The second linear part 76t is parallel to the first linear part 76s. The second linear part 76t is disposed to be shifted inward in the radial direction with respect to an imaginary line L extending the first linear part 76s.

The terminal connection part 76c is located on one end of the W-phase second bus bar 76. The terminal connection part 76c is bent about 90° inward in the radial direction from an end of the second linear part 76t, and extends in a direction perpendicular to the radial direction. The terminal connection part 76c is disposed to be shifted outward in the radial direction with respect to the terminal connection part 75c of the W-phase first bus bar 75. The terminal connection part 76c is disposed parallel to the terminal connection part 75c of the W-phase first bus bar 75. The terminal connection part 76c is connected to the W-phase external connection terminal 83.

The first lead wire connection part 76a is located on the other end of the W-phase second bus bar 76. The first lead wire connection part 76a is connected to a second lead wire 45 protruding upward from the bus bar holder 61. The first lead wire connection part 76a has the same shape as the first lead wire connection part 71a. The first lead wire connection part 76a has a U-shape that opens inward in the radial direction. The first lead wire connection part 76a includes an opening 76p that opens inward in the radial direction. The second lead wire 45 is located on an inner side of the first lead wire connection part 76a. The second lead wire 45 is joined to the first lead wire connection part 76a by laser welding or the like.

The first lead wire connection part 76a further includes a first end 76d and a second end 76e. The first end 76d is connected to an end of the first linear part 76s. The second end 76e is located on the opposite side of the first end 76d. The second end 76e is provided with an extending part 76f extending in a direction away from the opening 76p of the first lead wire connection part 76a. The extending part 76f extends in a direction perpendicular to the radial direction.

The second lead wire connection part 76b is located between the terminal connection part 76c and the first lead wire connection part 76a. The second lead wire connection part 76b is located between the second linear part 76t and the first linear part 76s. The second lead wire connection part 76b has the same shape as the second lead wire connection part 71b. The second lead wire connection part 76b has a U-shape that opens inward in the radial direction. The second lead wire connection part 76b includes an opening 76p that opens inward in the radial direction.

The second lead wire connection part 76b is connected to a second lead wire 45 protruding upward from the bus bar holder 61. The second lead wire 45 is located on an inner side of the second lead wire connection part 76b. The second lead wire 45 is joined to the second lead wire connection part 76b by laser welding or the like.

The second lead wire connection part 76b further includes a third end 76h and the fourth end 76i. The third end 76h is connected to an end of the first linear part 76s. The fourth end 76i is located on the opposite side of the third end 76h. The fourth end 76i is connected to an end of the second linear part 76t.

The W-phase second bus bar 76 includes cross parts J5 and J6.

The cross part J5 intersects a portion of the V-phase first bus bar 73 when viewed in the vertical direction. The W-phase second bus bar 76 includes a retracting part 94A at the cross part J5. The retracting part 94A passes above the V-phase first bus bar 73 where the retracting part 94A intersects. The retracting part 94A passes above the first linear part 73s of the V-phase first bus bar 73. The retracting part 94A is provided on the first linear part 76s of the W-phase second bus bar 76. The retracting part 94A is provided on the first lead wire connection part 76a side in the first linear part 76s.

The cross part J6 intersects a portion of the U-phase first bus bar 71 when viewed in the vertical direction. The W-phase second bus bar 76 includes a retracting part 94B at the cross part J6. The retracting part 94B passes above the U-phase first bus bar 71 where the retracting part 94B intersects. The retracting part 94B passes above the first linear part 71s of the U-phase first bus bar 71. The retracting part 94B is provided on the first linear part 76s of the W-phase second bus bar 76. The retracting part 94B is provided on the second lead wire connection part 76b side in the first linear part 76s.

The retracting parts 94A and 94B have the same shape as the retracting part 93. The retracting parts 94A and 94B straddle upper sides of the first linear part 73s of the V-phase first bus bar 73 and the first linear part 71s of the U-phase first bus bar 71. The retracting part 94A and 94B is disposed at an interval between the first linear part 73s of the V-phase first bus bar 73 and the first linear part 71s of the U-phase first bus bar 71.

The W-phase second bus bar 76 is held by a clamping part 66 at the first linear part 76s. In other words, the W-phase second bus bar 76 is held by the clamping part 66 between the first lead wire connection part 76a and the second lead wire connection part 76b. The W-phase first bus bar 75 and the W-phase second bus bar 76 are arranged at an angle different from the U-phase first bus bar 71 and the U-phase second bus bar 72, and the V-phase first bus bar 73 and the V-phase second bus bar 74 by 120° in the circumferential direction, respectively.

The W-phase first bus bar 75 and the W-phase second bus bar 76 held by the clamping parts 66 are arranged along the upper surface of the bus bar holder 61. The W-phase first bus bar 75 and the W-phase second bus bar 76 may be spaced apart from the upper surface of the bus bar holder 61 or may be in contact with the upper surface of the bus bar holder 61.

The vertical positions of the W-phase first bus bar 75 and the W-phase second bus bar 76 coincide with those of the U-phase first bus bar 71 and the U-phase second bus bar 72 at the first linear part 75s, the second linear part 75t, the terminal connection part 75c, the first lead wire connection part 75a, and the second lead wire connection part 75b, and the first linear part 76s, the second linear part 76t, the terminal connection part 76c, the first lead wire connection part 76a, and the second lead wire connection part 76b. In other words, the vertical positions of the W-phase first bus bar 75 and the W-phase second bus bar 76 coincide with those of the U-phase first bus bar 71 and the U-phase second bus bar 72 at portions other than the retracting parts 93A, 93B, 94A, and 94B.

The first lead wire connection part 76a and the second lead wire connection part 76b are arranged on a concentric circle centered on the central axis J when viewed in the vertical direction. Further, the first lead wire connection part 76a and the second lead wire connection part 76b, and the first lead wire connection part 75a and the second lead wire connection part 75b of the W-phase first bus bar 75 are arranged on a concentric circle centered on the central axis J when viewed in the vertical direction.

In the W-phase first bus bar 75 and the W-phase second bus bar 76, the first linear part 75s and the first linear part 76s are located on the opposite sides with respect to the central axis J. Further, in the W-phase first bus bar 75 and the W-phase second bus bar 76, the first linear part 75s and the first linear part 76s extend in parallel.

Further, the W-phase first bus bar 75 and the W-phase second bus bar 76 extend to mutually opposite sides in the circumferential direction from the W-phase external connection terminal 83 connected thereto.

As a result, a magnetic field generated by the W-phase first bus bar 75 and a magnetic field generated by the W-phase second bus bar 76 cancel each other, so that influence on the outside is suppressed.

As shown in FIG. 4, a plurality of external connection terminals 80 are provided on the upper surface of the bus bar holder 61. In the present example embodiment, the external connection terminals 80 include the U-phase external connection terminal 81, the V-phase external connection terminal 82, and the W-phase external connection terminal 83. Each of the U-phase external connection terminal 81, the V-phase external connection terminal 82, and the W-phase external connection terminal 83 is connected to the bus bar 70 and extends upward from bus bar 70. Each of the U-phase external connection terminal 81, the V-phase external connection terminal 82, and the W-phase external connection terminal 83 is composed of a terminal member 85 having a common shape.

The terminal member 85 is made of a conductive metal material. The terminal member 85 is a plate-shaped member and extends upward. The terminal member 85 includes a terminal stretched part 86 and a terminal base part 87. The terminal stretched part 86 is connected to a connector (not shown) of an external device.

The terminal base part 87 is held by the terminal holding part 69 of the bus bar holder 61. Both side ends of the columnar members 69a and 69b in a width direction are inserted into the holding grooves 69m and 69n.

The terminal member 85 includes a bus bar holding groove 89. The bus bar holding groove 89 is formed on a lower end of the terminal base part 87. The bus bar holding groove 89 has a U-shape and opens toward a lower side of the terminal base part 87. Two bus bar holding grooves 89 are provided at an interval in the width direction of the terminal base part 87.

As shown in FIG. 7, the terminal connection part 71c of the U-phase first bus bar 71 and the terminal connection part 72c of the U-phase second bus bar 72 are inserted into the bus bar holding grooves 89, 89 of the U-phase external connection terminal 81, respectively. The bus bar holding grooves 89, 89 of the U-phase external connection terminal 81 and the terminal connection parts 71c and 72c are joined by laser welding or the like.

As shown in FIG. 8, the terminal connection part 73c of the V-phase first bus bar 73 and the terminal connection part 74c of the V-phase second bus bar 74 are inserted into the bus bar holding grooves 89, 89 of the V-phase external connection terminal 82, respectively. The bus bar holding grooves 89, 89 of the V-phase external connection terminal 82 and the terminal connection parts 73c and 74c are joined by laser welding or the like.

As shown in FIG. 4, the terminal connection part 75c of the W-phase first bus bar 75 and the terminal connection part 76c of the W-phase second bus bar 76 are inserted into the bus bar holding grooves 89, 89 of the W-phase external connection terminal 83, respectively. The bus bar holding grooves 89, 89 of the W-phase external connection terminal 83 and the terminal connection parts 75c and 76c are joined by laser welding or the like.

In order to assemble the above-described bus bar holder 61, first, the U-phase first bus bar 71 and the U-phase second bus bar 72 are assembled to the bus bar holder 61 as shown in FIG. 7. Here, the first linear part 71s of the U-phase first bus bar 71 and the first linear part 72s of the U-phase second bus bar 72 are each fitted into the clamping part 66 by snap fitting. In this manner, a front end of each of the second lead wires 45 is inserted into each of the first lead wire connection part 71a and the second lead wire connection part 71b of the U-phase first bus bar 71, and each of the first lead wire connection part 72a and the second lead wire connection part 72b of the U-phase second bus bar 72.

Next, the V-phase first bus bar 73 and the V-phase second bus bar 74 are assembled to the bus bar holder 61 as shown in FIG. 8. Here, the first linear part 73s of the V-phase first bus bar 73 and the first linear part 74s of the V-phase second bus bar 74 are each fitted into the clamping part 66 by snap fitting. In this manner, a front end of each of the second lead wires 45 is inserted into each of the first lead wire connection part 73a and the second lead wire connection part 73b of the V-phase first bus bar 73, and each of the first lead wire connection part 74a and the second lead wire connection part 74b of the V-phase second bus bar 74.

Next, the W-phase first bus bar 75 and the W-phase second bus bar 76 are assembled to the bus bar holder 61 as shown in FIG. 4. Here, the first linear part 75s of the W-phase first bus bar 75 and the first linear part 76s of the W-phase second bus bar 76 are each fitted into the clamping part 66 by snap fitting. In this manner, a front end of each of the second lead wires 45 is inserted into each of the first lead wire connection part 75a and the second lead wire connection part 75b of the W-phase first bus bar 75, and each of the first lead wire connection part 76a and the second lead wire connection part 76b of the W-phase second bus bar 76.

Subsequently, each terminal member 85 is attached to each terminal holding part 69. Thus, the terminal connection part 71c of the U-phase first bus bar 71 and the terminal connection part 72c of the U-phase second bus bar 72 are inserted into the bus bar holding grooves 89, 89 of the U-phase external connection terminal 81, respectively. The terminal connection part 73c of the V-phase first bus bar 73 and the terminal connection part 74c of the V-phase second bus bar 74 are inserted into the bus bar holding grooves 89, 89 of the V-phase external connection terminal 82. The terminal connection part 75c of the W-phase first bus bar 75 and the terminal connection part 76c of the W-phase second bus bar 76 are inserted into the bus bar holding grooves 89, 89 of the W-phase external connection terminal 83.

Next, each of a plurality of bus bars (the U-phase first bus bar 71, the U-phase second bus bar 72, the V-phase first bus bar 73, the V-phase second bus bar 74, the W-phase first bus bar 75, and the W-phase second bus bar 76) is welded to each second lead wire 45. Here, each of the lead wire connection parts 71a, 71b, 72a, 72b, 73a, 73b, 74a, 74b, 75a, 75b, 76a, and 76b is welded to each second lead wire 45.

For example, the U-phase first bus bar 71 will be described as an example. As shown in FIG. 6, in order to weld the first lead wire connection part 71a of the U-phase first bus bar 71 and the second lead wire 45, the pair of stretched parts 71v that are fitted through a welding jig 100 from the outside maintains. In this state, the first lead wire connection part 71a and the second lead wire 45 are welded by laser welding or the like. The first lead wire connection part 71a includes the first linear part 71s and the extending part 71f on both sides thereof through the first end 71d and the second end 71e. Here, when a positional displacement occurs in the welding jig 100 fitting the first lead wire connection part 71a, the welding jig 100 is brought into contact with the first linear part 71s and the extending part 71f. Thus, further positional displacement of the welding jig 100 is suppressed, so that the first lead wire connection part 71a is securely held by welding jig 100.

In order to weld the first lead wire connection part 71b of the U-phase first bus bar 71 and the second lead wire 45, the pair of stretched parts 71v that are fitted through a welding jig 100 from the outside maintains. In this state, the second lead wire connection part 71b and the second lead wire 45 are welded by laser welding or the like. The second lead wire connection part 71b includes the first linear part 71s and the second linear part 71t on both sides thereof through the third end 71h and the fourth end 71i. Here, when a positional displacement occurs in the welding jig 100 fitting the second lead wire connection part 71b, the welding jig 100 is brought into contact with the first linear part 71s and the second linear part 71t. Thus, the second lead wire connection part 71b is securely held by the welding jig 100.

In the same manner, welding is performed while holding each lead wire connection part by the welding jig 100 on the U-phase second bus bar 72, the V-phase first bus bar 73, the V-phase second bus bar 74, the W-phase first bus bar 75, and the W-phase second bus bar 76.

The welding of each second lead wire 45 and each of the U-phase first bus bar 71, the U-phase second bus bar 72, the V-phase first bus bar 73, the V-phase second bus bar 74, the W-phase first bus bar 75, and the W-phase second bus bar 76 is sequentially performed by rotating the bus bar holder 61 about the central axis J with respect to a laser irradiation nozzle that performs laser welding and the welding jig 100.

Thereafter, the U-phase external connection terminal 81, the V-phase external connection terminal 82, and the W-phase external connection terminal 83 are welded to the U-phase first bus bar 71 and U-phase second bus bar 72, the V-phase first bus bar 73 and the V-phase second bus bar 74, and the W-phase first bus bar 75 and the W-phase second bus bar 76, respectively.

Thereby, the assembly of the bus bar unit 60 is completed.

According to the present example embodiment, the bus bars 70 (the U-phase first bus bar 71, the U-phase second bus bar 72, the V-phase first bus bar 73, the V-phase second bus bar 74, the W-phase first bus bar 75, and the W-phase second bus bar 76) are each composed of the wire 77. As described above, by using the wire 77 for the bus bar 70, the bus bar 70 may be manufactured by a forming machine. Thus, the need for a mold for manufacturing the bus bar 70 is eliminated. Thus, the U-phase first bus bar 71, the U-phase second bus bar 72, the V-phase first bus bar 73, the V-phase second bus bar 74, the W-phase first bus bar 75, and the W-phase second bus bar 76 having different shapes from each other may be manufactured at low cost. As described above, by using the wire 77 for the bus bar 70, it is easy to cope with a small quantity batch production. Further, a design change of the bus bar 70 may be easily coped with. Further, by using the wire 77 for the bus bar 70, the number of wires 77 which becomes unnecessary is reduced as compared with the press processing, thereby improving the product yield of materials.

Further, each of the lead wire connection parts 71a, 71b, 72a, 72b, 73a, 73b, 74a, 74b, 75a, 75b, 76a, and 76b has a U-shape that opens in the radial direction. Thereby, it is not necessary to change the posture of the welding jig 100 in the welding process. Accordingly, the manufacturing process may be simplified.

Further, by providing the first linear parts 71s to 76s, the dimension of the bus bar 70 in the radial direction may be easily reduced as compared with the case in which the bus bar 70 is curved without providing the linear parts. Thus, the bus bar 70 and the bus bar unit 60 including the same may be miniaturized. Further, by providing the first linear parts 71s to 76s, the first lead wire connection parts 71a to 76a may be connected to the second lead wire connection parts 71b to 76b at the shortest distance. Thereby, the use amount of the wire 77 may be saved.

Accordingly, the bus bar 70 may be miniaturized, and the use amount of the wire 77 required to form the bus bar 70 may be saved.

According to the present example embodiment, the second ends 71e to 76e are provided with the extending parts 71f to 76f extending in the direction away from the openings 71p to 76p of the first lead wire connection parts 71a to 76a. Thereby, the positional displacement of the welding jig 100 may be suppressed when welding the first lead wire connection parts 71a to 76a and the second lead wires 45. Thus, the first lead wire connection parts 71a to 76a may be stably held, so that the process of welding the first lead wire connection parts 71a to 76a and the second lead wires 45 may be stably performed.

According to the present example embodiment, the second lead wire connection parts 71b to 76b include the first linear parts 71s to 76s and the second linear parts 71t to 76t at both ends thereof through the third ends 71h to 76h and the fourth ends 71i to 76i. Thereby, the positional displacement of the welding jig 100 may be suppressed when welding the second lead wire connection parts 71b to 76b and the second lead wires 45.

Further, the second linear parts 71t to 76t are parallel to the first linear parts 71s to 76s, and are arranged to be shifted from the imaginary lines L extending the first linear parts 71s to 76s. Thus, the plurality of bus bars 70 may be easily disposed while avoiding interference therebetween.

According to the present example embodiment, the first lead wire connection parts 71a to 76a and the second lead wire connection parts 71b to 76b are arranged on concentric circles centered on the central axis J when viewed in the vertical direction. Thereby, when the bus bar holder 61 is rotated about the central axis J when the first lead wire connection parts 71a to 76a and the second lead wire connection parts 71b to 76b are welded to the second lead wires 45, it is not necessary to move the welding jig 100 and a laser welding nozzle in the radial direction. Thus, the welding process may be performed efficiently.

According to the present example embodiment, each of the U-phase first bus bar 71, the U-phase second bus bar 72, the V-phase first bus bar 73, the V-phase second bus bar 74, the W-phase first bus bar 75, and the W-phase second bus bar 76 is held by each clamping part 66 at each of the first linear parts 71s to 76s. Thereby, the positional accuracy of the first lead wire connection parts 71a to 76a and the second lead wire connection parts 71b to 76b, which are located on both sides of the first linear parts 71s to 76s, with respect to the second lead wires 45 may be improved. Further, when vibration is applied from the outside, load applied to the first lead wire connection parts 71a to 76a and the second lead wire connection parts 71b to 76b may be suppressed.

According to the present example embodiment, each of the bus bars 70 is held by each of the clamping parts 66 between the first lead wire connection parts 71a to 76a and the second lead wire connection parts 71b to 76b. Thus, the positional accuracy of the first lead wire connection parts 71a to 76a and the second lead wire connection parts 71b to 76b may be improved. Further, when vibration is applied from the outside, load applied to the first lead wire connection parts 71a to 76a and the second lead wire connection parts 71b to 76b may be suppressed.

According to the present example embodiment, the plurality of bus bars 70 include the cross parts J1 to J6 crossing each other when viewed in the vertical direction, and one side of the pair of bus bars 70 crossing each other includes the retracting part 93 passing above the other side of the pair of bus bars 70 at the cross parts J1 to J6. Thereby, the U-phase first bus bar 71, the U-phase second bus bar 72, the V-phase first bus bar 73, the V-phase second bus bar 74, the W-phase first bus bar 75, and the W-phase second bus bar 76 may be arranged while minimizing the dimension in the vertical direction. Thus, the bus bar unit 60 may be miniaturized.

Further, the U-phase first bus bar 71, the U-phase second bus bar 72, the V-phase first bus bar 73, the V-phase second bus bar 74, the W-phase first bus bar 75, and the W-phase second bus bar 76 may be held by the clamping parts 66. Thereby, it is possible to suppress the bus bars 70 from coming into contact with each other at the cross parts J1 to J6 even when vibration or the like is applied.

Further, in the U-phase first bus bar 71, the U-phase second bus bar 72, the V-phase first bus bar 73, the V-phase second bus bar 74, the W-phase first bus bar 75, and the W-phase second bus bar 76, the vertical positions of at least the terminal connection parts 71c to 76c and the first lead wire connection parts 71a to 76a coincide with each other. As a result, it is not necessary to move the welding jig 100 and the laser welding nozzle in the vertical direction. Thus, the welding process may be performed efficiently.

According to the present example embodiment, in the U-phase first bus bar 71, the U-phase second bus bar 72, the V-phase first bus bar 73, the V-phase second bus bar 74, the W-phase first bus bar 75, and the W-phase second bus bar 76, the vertical positions of the terminal connection parts 71c to 76c and the first lead wire connection parts 71a to 76a are held by the clamping parts 66 at the same regions. Thereby, the U-phase first bus bar 71, the U-phase second bus bar 72, the V-phase first bus bar 73, the V-phase second bus bar 74, the W-phase first bus bar 75, and the W-phase second bus bar 76 may be arranged while minimizing the dimensions in the vertical direction. Thus, the bus bar unit 60 may be miniaturized. Further, the vertical positions of the clamping parts 66 may be set at the same position.

Further, in the V-phase first bus bar 73, the V-phase second bus bar 74, the W-phase first bus bar 75, and the W-phase second bus bar 76, the clamping parts 66 hold the roots of the retracting parts 93, 94, 93A, 93B, 94A, and 94B. Thereby, the positional accuracy of the terminal connection parts 73c to 76c, the first lead wire connection parts 73a to 76a, and the second lead wire connection parts 73b to 76b may be improved. Further, even when vibration or the like is applied, load may be suppressed from being applied to the terminal connection parts 73c to 76c, the first lead wire connection parts 73a to 76a, and the second lead wire connection parts 73b to 76b.

According to the present example embodiment, the V-phase first bus bar 73 and the V-phase second bus bar 74 include the retracting parts 93 and 94 at portions crossing the U-phase first bus bar 71 and the U-phase second bus bar 72. The W-phase first bus bar 75 and the W-phase second bus bar 76 include the retracting parts 93A, 93B, 94A, and 94B at each portion crossing each of the U-phase first bus bar 71, the U-phase second bus bar 72, the V-phase first bus bar 73, and the V-phase second bus bar 74. Thereby, the bus bars 70 may be assembled on the bus bar holder 61 in the order of the U-phase first bus bar 71 and the U-phase second bus bar 72, the V-phase first bus bar 73 and the V-phase second bus bar 74, the W-phase first bus bar 75 and the W-phase second bus bar 76, so that the bus bar unit 60 may be assembled easily.

According to the present example embodiment, the motor 10 includes the above-described bus bar unit 60. Thus, the bus bar 70 may be miniaturized, and the use amount of the wire 77 required to form the bus bar 70 may be saved.

According to the present example embodiment, the motor 10 includes the above-described bus bar unit 60. Thus, the first lead wire connection parts 71a to 76a may be stably held, so that the process of welding the first lead wire connection parts 71a to 76a and the second lead wires 45 may be stably performed.

According to the present example embodiment, the motor includes the above-described bus bar unit 60. Thus, it is possible to suppress securely the bus bars 70 from coming into contact with each other and to perform the welding process efficiently.

Figure 9:
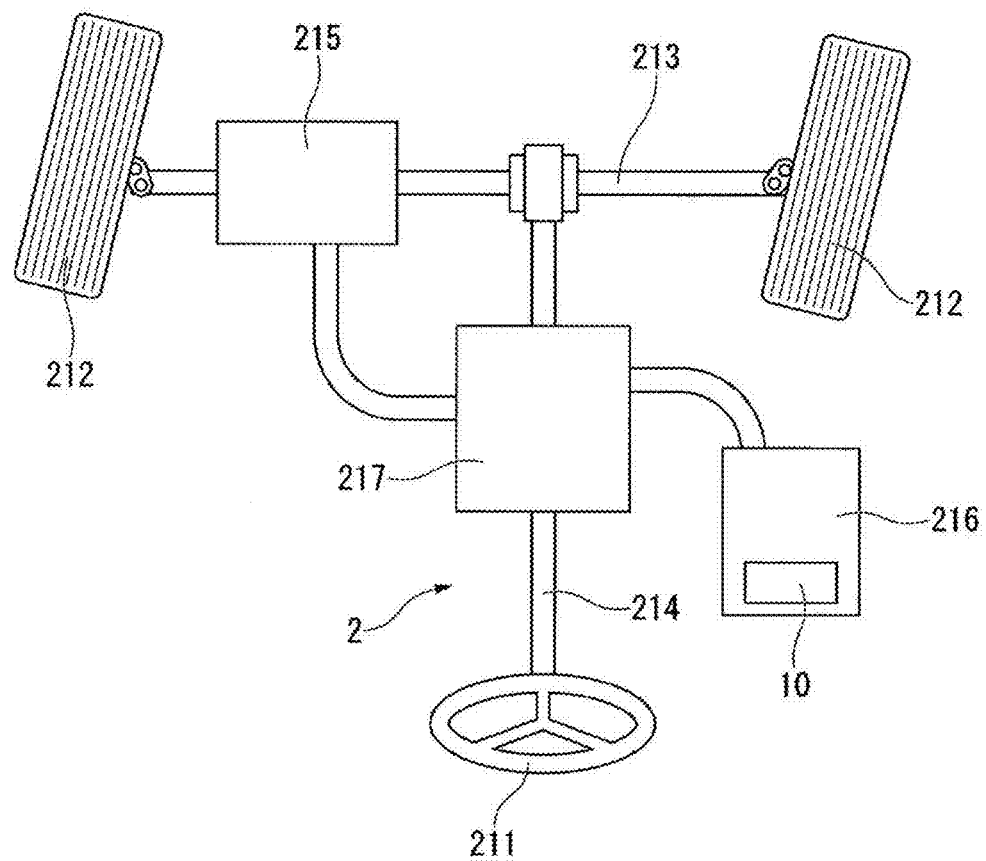
FIG. 9 is a view illustrating an apparatus to which a motor according to an example embodiment of the present disclosure is mounted.

FIG. 9 is a view illustrating an apparatus to which the motor according to the example embodiment is mounted.

Next, an example embodiment of an apparatus to which the motor 10 of the present example embodiment is mounted will be described. In the present example embodiment, an example in which the motor 10 is mounted on an electric power steering apparatus will be described. An electric power steering apparatus 2 shown in FIG. 9 is mounted on a steering mechanism of a wheel of an automobile. The electric power steering apparatus 2 is an apparatus configured to reduce a steering force by hydraulic pressure. The electric power steering apparatus 2 includes the motor 10, a steering shaft 214, an oil pump 216, and a control valve 217.

The steering shaft 214 transmits an input from a steering 211 to an axle 213 having wheels 212. The oil pump 216 generates hydraulic pressure in a power cylinder 215 that transmits a driving force by the hydraulic pressure to the axle 213. The control valve 217 controls oil of the oil pump 216. In the electric power steering apparatus 2, the motor 10 is mounted as a driving source of the oil pump 216.

The electric power steering apparatus 2 of the present example embodiment includes the motor 10 of the present example embodiment, and thus the bus bar unit 60 may be miniaturized, and the influence of a magnetic field on the outside may be suppressed.

Although the example embodiment of the present disclosure has been described above, each configuration and combination thereof in the example embodiment are an example, and addition, omission, replacement, and other modifications of the configuration are possible without departing from the spirit of the present disclosure. Further, the present disclosure is not limited by the example embodiment.

For example, the motor of the example embodiment described above is not limited to being mounted on an electric power steering apparatus, and may be mounted on any apparatus.

Further, in the above-described example embodiment, each of the bus bars 70 has a configuration including each of the first lead wire connection parts 71a to 76a and each of the second lead wire connection parts 71b to 76b, but may have a configuration including three or more lead wire connection parts.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A bus bar unit that is provided in a motor, the bus bar unit comprising:
   a bus bar holder provided on one side in an axial direction of a stator disposed in an annular shape around a central axis extending in a vertical direction;
   a bus bar extending along a plane perpendicular to the axial direction and fixed to the bus bar holder; and
   an external connection terminal connected to the bus bar and extending upward from the bus bar; wherein
   the bus bar includes a wire and a terminal connector located on one end thereof and connected to the external connection terminal, a first lead wire connector located on the other end thereof and connected to a lead wire extending from the stator, a second lead wire connector located between the terminal connector and the first lead wire connector, and a first linear portion to connect the first lead wire connector to the second lead wire connector and having a linear shape when viewed in the axial direction; and
   each of the first lead wire connector and the second lead wire connector have a U-shape that opens in a radial direction.

2. The bus bar unit of claim 1, wherein
   the first lead wire connector includes a first end connected to the first linear portion and a second end located on the opposite side of the first end; and
   the second end is provided with an extension that extends in a direction away from an opening of the first lead wire connector.

3. The bus bar unit of claim 1, wherein
   the second lead wire connector includes a third end connected to the first linear portion and a fourth end located on the opposite side of the third end;
   the bus bar includes a second linear portion extending from the fourth end and having a linear shape when viewed in the axial direction; and
   the second linear portion is shifted from an imaginary line extending the first linear portion.

4. The bus bar unit of claim 3, wherein the second linear portion is parallel or substantially parallel to the first linear portion.

5. The bus bar unit of claim 1, wherein the first lead wire connector and the second lead wire connector are arranged on a concentric circle having the central axis as a center when viewed in the axial direction.

6. The bus bar unit of claim 5, wherein
   a plurality of bus bars are included; and
   the first lead wire connector and the second lead wire connector of each of the bus bars are arranged on a concentric circle having the central axis as a center when viewed in the axial direction.

7. The bus bar unit of claim 1, wherein
   the bus bar holder includes a clamp to hold the bus bar by fitting the bus bar thereinto; and
   the bus bar is held in the clamp at the first linear portion.

8. A motor comprising:
   the bus bar unit of claim 1;
   the stator around which a coil wire is wound; and
   a rotor facing the stator in the radial direction through a gap.

* * * * *